(12) United States Patent
Rogerson et al.

(10) Patent No.: US 7,644,354 B2
(45) Date of Patent: Jan. 5, 2010

(54) SYSTEMS AND METHODS FOR SUPPORTING FLEXIBLE INFORMATION APPEARANCE AND BEHAVIOR WITH EXTENSIBLE MULTI-PHASE TRANSFORM ENGINE

(75) Inventors: Dale Elton Rogerson, Seattle, WA (US); Justin Shane McRoberts, Seattle, WA (US); Andrew Douglas Reddish, Seattle, WA (US); Sridhar Chandrashekar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 490 days.

(21) Appl. No.: 11/118,025

(22) Filed: Apr. 29, 2005

(65) Prior Publication Data

US 2006/0248445 A1 Nov. 2, 2006

(51) Int. Cl.
*G06N 3/00* (2006.01)
(52) U.S. Cl. .................................................. 715/234
(58) Field of Classification Search ................. 715/513, 715/517, 523, 530, 234, 243, 254, 255
See application file for complete search history.

(56) References Cited

U.S. PATENT DOCUMENTS 6,144,966 A * 11/2000 Roberts .................. 707/101

OTHER PUBLICATIONS

Presentation entitled "Programming Windows Help," by Shane McRoberts, © 2003-2004, Microsoft Corporation, pp. 1-6.
Functional Specification entitled "Microsoft® NUI Help Platform Infrastructure," May 1, 2003, pp. 1-17.
McRoberts, S., "Windows "Longhorn" Help Experience," Microsoft Help, downloaded 2008, 55 pages.

* cited by examiner

*Primary Examiner*—Kyle R Stork
(74) *Attorney, Agent, or Firm*—Woodcock Washburn LLP (57) ABSTRACT

Flexible information appearance and behavior can be achieved with an extensible multi-phase transform engine. The transform engine can apply a series of transforms to markup language content. In a help service embodiment, application creators can specify a Uniform Resource Indicator (URI) for help content, and a collection of transforms and/or executable code for formatting and presenting the help content. The transforms may be custom transforms registered with the help service, or may be selected from a set of stock pre-registered transforms. The transforms can be applied by the engine to the help content. Custom transforms and transform selection may be used to control content appearance and engine output format. Transform operation may also trigger custom executable code to accomplish desired help behaviors.

20 Claims, 8 Drawing Sheets

| Transformation Library Information | |
|---|---|
| Phase #1 Name | Name |
| XSLT #1 | URI of the XSLT |
| XSLT #2 | URI of the XSLT |
| ... | |
| XSLT #n | URI of the XSLT |
| Phase #2 Name | Name |
| XSLT #1 | URI of the XSLT |
| XSLT #2 | URI of the XSLT |
| ... | |
| XSLT #m | URI of the XSLT |
| ... | |
| Phase #n Name | Name |
| Extensibility Object Information | |
| ObjectTag #1 or ObjectId #1 | Information needed to create that object such as DLL, CLSID, etc |
| ObjectTag #2 or ObjectId #n | Information needed to create that object such as DLL, CLSID, etc |
| ... | |
| ObjectTag #n or ObjectId #n | Information needed to create that object such as DLL, CLSID, etc |

SYSTEMS AND METHODS FOR SUPPORTING FLEXIBLE INFORMATION APPEARANCE AND BEHAVIOR WITH EXTENSIBLE MULTI-PHASE TRANSFORM ENGINE

FIELD OF THE INVENTION

This invention relates to computing, and more particularly to presentation of mark-up language content, and more particularly to supporting flexible control over the appearance and behavior of such content.

BACKGROUND OF THE INVENTION

Modem computing systems may provide some centralized functions that are accessible by various applications. Often, though not always, such centralized functions are associated with an operating system. One function that may be centralized is display of information, e.g., information of a particular type, to a user.

For example, consider the help service that is incorporated into the MICROSOFT WINDOWS® operating system. As computers and applications become more sophisticated, it is desirable to provide users with information to educate themselves on the features of their computing environment and applications. A help service may provide users with information on an enormous range of topics. It may provide, for example, information and instructions for proper use of an operating system. Some of the topics may be helpful to users in a multitude of scenarios, so the help service may also comprise functions for selectively presenting topics to maximize value for users.

As a service such as the help service becomes more sophisticated, it is desirable to access it from applications. An application may draw upon a help service for explanation of an operating system feature, for example. In another example, the application creator may wish to specify his own help content, but draw upon other helpful features of a centralized help service. In such situations, the application creator may prefer to direct a user, through the application's user interface, to a centralized operating system help service. This may be easier than designing a new help service. This would allow for more efficient application design, because application creators could reuse existing centralized functions. Thus, the help service is an example of a function for displaying information that could be centralized for the benefit of the applications that may run on a computer system.

Content that is managed and displayed in many modem computing settings may be markup language content. Extensible Markup Language (XML), Hyper-Text Markup Language (HTML), and Microsoft Assistance Markup Language (MAML) are all examples of markup languages. Markup languages can be displayed by processes that recognize the various elements within a particular markup language file, and display a corresponding element, with any specified properties in the markup language file.

Markup language files may be converted from one format to another using a transform. As one might imagine, transforms involve code that identifies every element in a first markup language file, and then re-identifies and reconfigures those elements into a format that is recognizable to a different schema or application. Such code must be properly written according to the need and the confines of the transformation language. To draw from XML for an example, transforms of one XML document into another XML document, or some other data format, are generally performed using Extensible Stylesheet Language Transformations ("XSLT").

Thus, in a system such as the MICROSOFT® help service, described above, we have markup and/or other content that can be drawn upon for visual display by a computer system. Some of the markup content may be centralized, and various processes for accessing and rendering the content may also be centralized, such that it is accessible from a variety of applications with access to the computer system. It would be desirable, in this setting, to support customization of the appearance of the content. Application creators may want content to appear consistent with the other aspects of their application. They may also want to insert features and additional content that may not be present or available from the centralized system.

SUMMARY OF THE INVENTION

Systems and methods for supporting flexible information appearance and behavior can comprise an extensible multi-phase transform engine. The transform engine can apply a series of transforms to markup language content. By separating content transformation into a number of phases, flexibility is achieved. The form of content that such a multiphase transform engine can take as input is flexibly modifiable to suit diverse needs, as is the output format and properties, or behaviors, of engine output. In a help service embodiment, application creators can specify a Uniform Resource Indicator (URI) for help content, and a collection of transforms and/or executable code for formatting and presenting the help content. The transforms may be custom transforms registered with the help service, or may be selected from a set of stock pre-registered transforms. The transforms can be applied by the engine to the help content to control content appearance and engine output format. Transform operation may also trigger custom executable code to accomplish desired help behaviors.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Exemplary Help Service Embodiment

Figure 1:
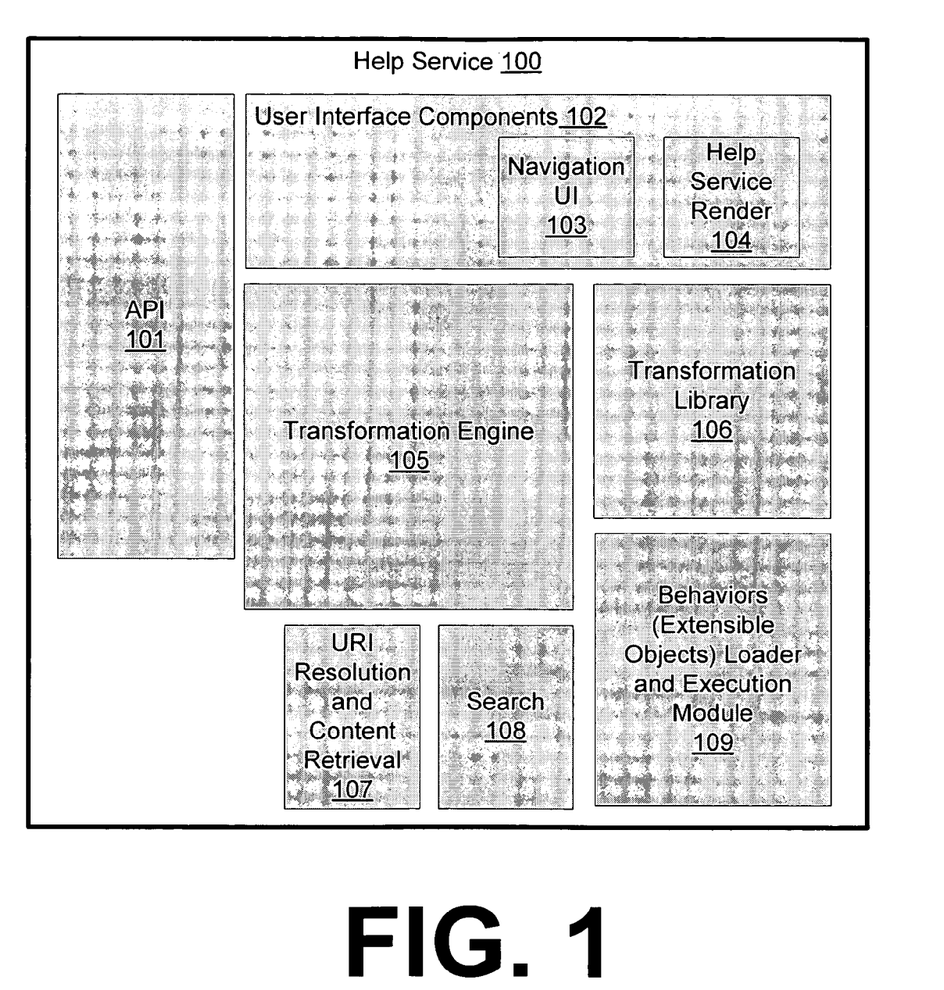
FIG. 1 illustrates the various parts of a help system 100 to be used with a transformation engine 105 such as that provided herein.

FIG. 1 illustrates the various parts of a help service 100 to be used with a transformation engine 105 discussed in greater detail herein. This figure thus provides context for an exemplary implementation of the invention. An exemplary help service may be incorporated into an operating systems such as MICROSOFT WINDOWS®, LINUX®, or APPLE OSX®. Help service software may also be sold separately, and installed on an operating system to provide the services discussed here. In either case, the help service comprises a plurality of transforms that may be used to modify markup language content. It should be understood that many of the aspects and features discussed here may be useful in other contexts as well.

The extensible multiphase transform engine 105 and various aspects thereof may be used in conjunction with the various other aspects of help service 100. Multiple applications may access centralized functions provided by help service 100. This may be accomplished by making function calls to API 101. The API 101 is a service that can receive function calls, or requests, from applications and initiate operations in the help service 100 to satisfy the requests. API 101 may ultimately return any requested data to the requesting application(s), or may initiate some other action in response to a request. An exemplary request to API 101 may comprise a request to locate and display identified markup content. A request may also provide some identified help content parameters, and request identification, location, and display of appropriate content that meets the provided parameters.

Identification and retrieval of requested help content may be carried out by 107. A Uniform Resource Identifier (URI) may be used to pinpoint the exact location of requested markup content. A URI may be "resolved" from a "friendly name" or text string that is more readily recognizable to human users. Once the URI is resolved, associated content may be retrieved by 107. Search 108 may also be beneficially incorporated in a help service 100. Search 108 allows matching of markup content that meets requested content parameters, as discussed above.

The content retrieved by 107 may itself may be centralized in a data store or database (not shown), or may be custom content that is specified by an application. Content, whether centralized or custom, may exist anywhere in a computer network. Content is frequently stored in networked databases and servers (not shown), or via an internet connection to a remote server (not shown). Content may also be stored locally, i.e., on a disk that is physically controlled by the same machine that executes software associated with the help service 100.

The appearance and behavior of retrieved content may be manipulated by transforms kept in transformation library 106 and/or executable code "behaviors" loaded and executed by 109. Transformation engine 105 may be responsible for applying transforms from 106 and initiating operation of behaviors via 109. Transformation library 109 need not keep a closed list of available transforms, but may instead keep an updatable list of transforms that are registered with help service 100. A set of default transforms may be made available in 106. New transforms may be registered, for example, by applications, application creators, help service administrators, and so forth. Similarly, new executable code may be registered with 106 and/or 109, and made available as part of help service 100.

Examples of help behaviors that could be loaded by 109 are state adaptation, inclusion of content from external sources, and product branding. U.S. patent application Ser. No. 10/819,607, and U.S. patent application Ser. No. 10/819,606, discuss behaviors in the context of a help service 100, and are hereby incorporated by reference in their entirety. Allowing custom help behaviors to be added to a help service and called through transforms provides the help service 100 with custom extensibility.

Finally, the exemplary help service 100 of FIG. 1 may comprise User Interface (UI) components 102 such as the navigation UI 103 and the help service render component 104. These components 102, 103, 104 may be used for example by requesting applications to render and display help service features. In one arrangement, an application may open the help navigation UI 103 in the application window, allowing for navigation through help topics within the environment of the application. The render component 104 may be responsible for display of any final output from the transformation engine 105. One advantageous feature of the transform engine 105 arrangement disclosed herein is the ability to output a variety of file formats that can be rendered by the particular rendering component 104 that may be available with a particular computer platform. Different output formats can be generated by selected transforms and/or behaviors from the various transforms and/or behaviors referenced in library 106.

While a help service 100 provides a useful embodiment of the invention for purposes of illustrating aspects of the invention, it should be understood that the invention is not limited to help service implementations. Any service for displaying markup content on behalf of computing applications may profitably employ aspects of the invention.

Collections of Transforms

Since markup language content processed by the multiphase transform engine may be subject to a selected set of transforms, potentially including custom transforms, and a selected set of behaviors, potentially including custom behaviors, a means for flexibly determining which transforms and which behaviors to apply to particular content is desirable. The collection of transforms, referred to in the help context as a help collection, serves this function. The collection of transforms identifies the transforms and behaviors to apply to a particular piece of markup content. The collection of transforms may be understood with reference to FIG. 2 and FIG. 3.

Figure 2:
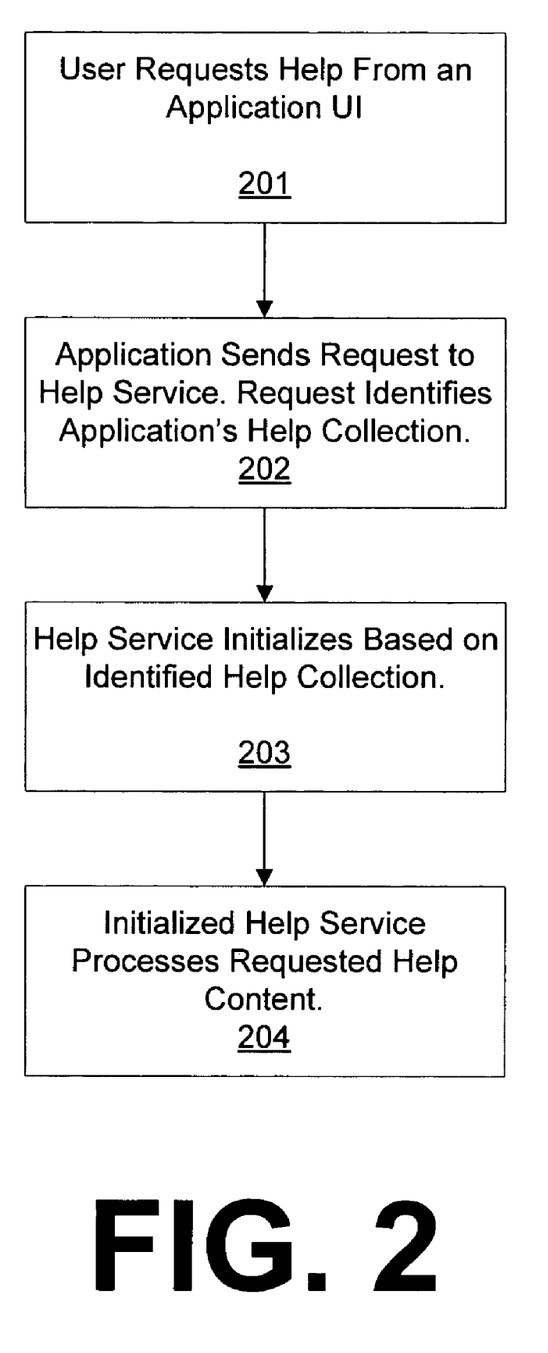
FIG. 2 illustrates an exemplary process for determining a collection of transforms to be used by a transform engine. The collection of transforms may comprise identifiers for transforms selected by an application creator to be used with a particular application's help functions.

FIG. 2 illustrates an exemplary process for determining a collection of transforms to be used by a transform engine when operating on associated help content. By providing an underlying registration system which loads when any set of content is loaded, the appropriate selected transforms and behaviors can be applied. Thus, the transforms of a particular collection can be registered prior to operation of the transform engine. The basic mechanics of the help service collection registration process may proceed as follows:

User requests help for a particular application 201.
The application sends a request to the help service asking it to open up a particular help collection 202.
The help system initializes based on the specified help collection 203.
Finally, the initialized help service displays content to the user as it is requested to do so 204.

The above process, as illustrated in FIG. 2, provides an exemplary means of registering a collection of transforms. Other processes are possible. For example, help content itself may specify a collection of transforms to be used when processing the content. A user, rather than an application, may specify the collection. In other words, the mechanism for determining what help collection will be "associated" with display of any arbitrary markup at any arbitrary time may change based on the needs of a given embodiment. Allowing application creators to specify a help collection for all help content called upon by a given application provides the advantages of giving the application creator control over that application's help functions. Other embodiments may be advantageous in other settings.

In particular, since the help service described herein can adapt to different rendering technologies, a collection of transforms may be maintained individually for each rendering target. For example there could be a transform library for plain text and a different one for DHTML.

Figure 3:
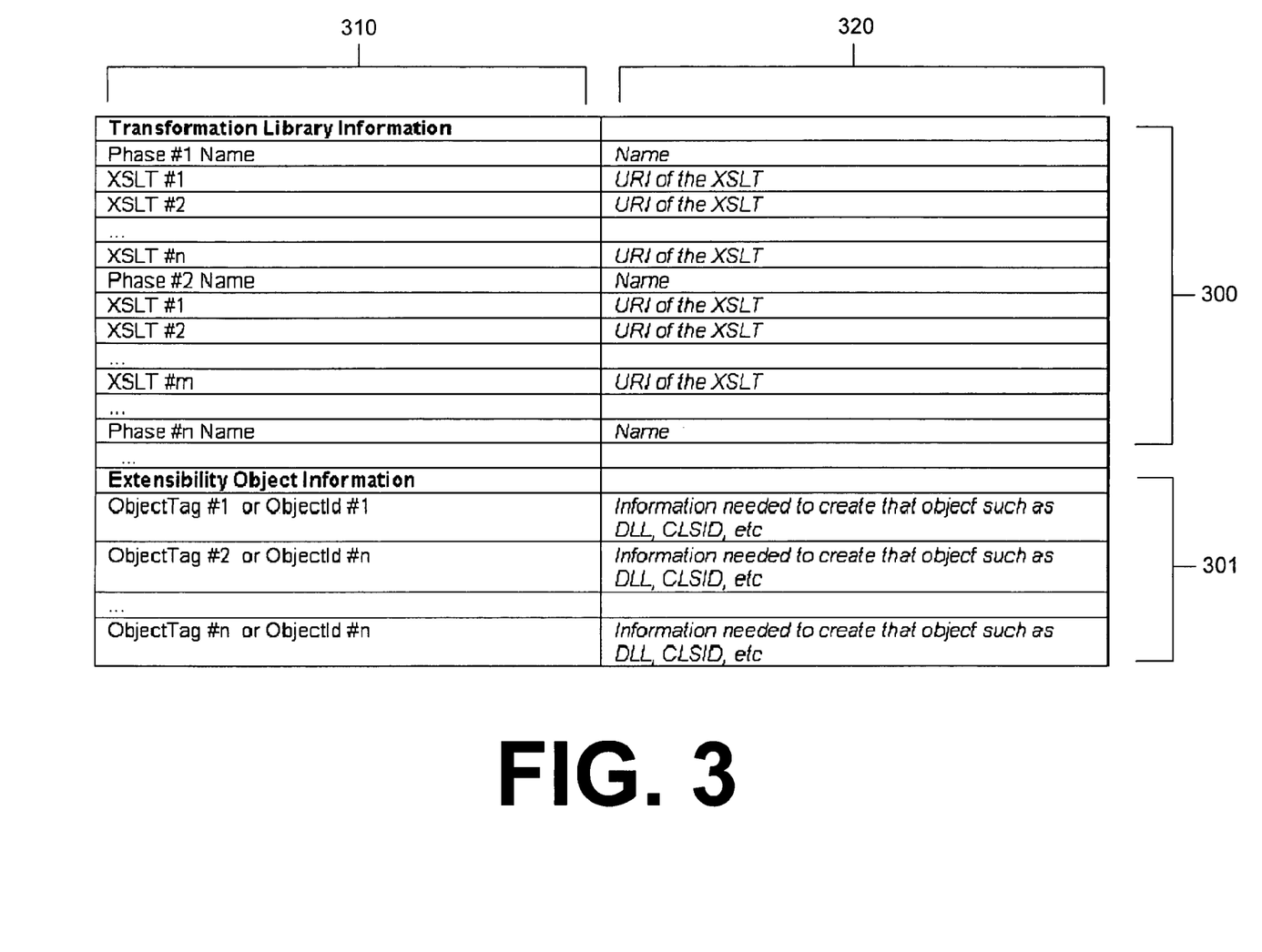
FIG. 3 illustrates a collection of transforms and executable code. The collection provides a means to specify the particular transforms and executable code that govern the appearance and behavior of help content for a given application. By customizing a collection and/or providing custom executable code, application creators can select help appearance qualities and behaviors.

FIG. 3 illustrates a collection of transforms 300 and executable code 301. The collection provides a means to specify the particular transforms 300 and executable code 301 that govern the appearance and behavior of help content for a given application. By customizing collection transforms 300 and/or providing custom executable code 301, application creators can select help content appearance and behaviors.

The transforms in FIG. 3 are denoted using the string "XSLT #1," "XSLT #2," and so forth. XSLT is an XML language that specifies rules to execute to transform one XML document to another. An XSLT document is called a stylesheet or transform (the terms are considered equivalent). An XSLT stylesheet contains templates. An XSLT processor, as may be included in the transformation engine provided herein, compares the elements in an input XML document to the templates in a stylesheet. When it finds a matching template, it writes the template's contents into an output or resultant tree. When it completes this step, it may serialize the output tree further into an XML document or another format, such as plain text or HTML. XSLT transforms are one very common type of transform for use with the invention. It should be noted that transformation of markup may be conducted via other means that may not be properly considered XSLT compliant. Any documents for use in transforming markup content from one form to another may be considered a transform or to be a process of "transforming" for the purposes of this description and claims.

Consider an exemplary application that can access a help service-MICROSOFT WINDOWS®. Note that while Windows® is an operating system, it can access a help service just as any other application. Opening the MICROSOFT WINDOWS® help collection, in one embodiment, can open all of the help transforms and behaviors associated with the Windows® Operating System (OS) and its utilities. This is accomplished by passing the help service a collection identifying said transforms and behaviors. Only the transforms and extensible objects registered by the MICROSOFT WINDOWS® help collection need be considered by the help service.

Figure 6:
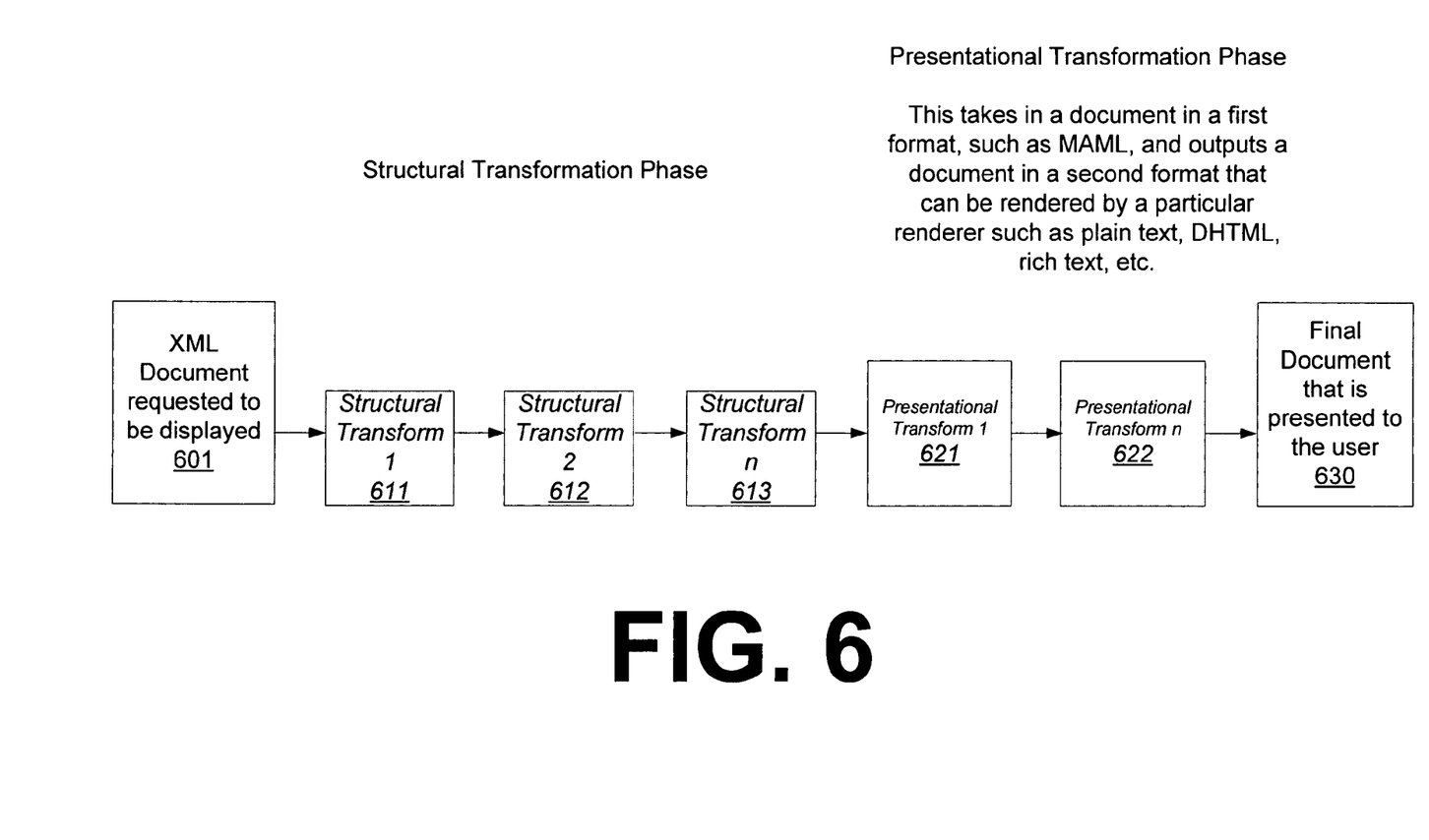
FIG. 6 illustrates an exemplary series of transforms divided into a structural phase and a presentation phase.

The help collection, as illustrated in FIG. 3, can inform a transform engine as to which transforms are to be executed, which phases execute, and how to find the different transforms and extensibility objects. As laid out in FIG. 3, the help collection can comprise two row groups and two columns. Of course the collection object can also be organized according to any other format for establishing the illustrated relationships. The first row group 300 can be a listing of transforms to execute. These transforms can be divided into phases, as shown. Each phase may comprise transforms in a conceptual category. It may be helpful to divide the transforms into phases in this way for a number of reasons. Phase division supports extensibility because custom transforms that fit with a particular phase may be associated with that phase. Phases also facilitate troubleshooting. Exemplary phases are illustrated in FIG. 6.

The second row group 301 can list extensibility object information for any objects associated with the collection. These objects may be only the custom objects associated with the collection, while default or standard objects need not be listed, or, in other embodiments, all objects to be utilized can be listed in 301.

The first column 310 can comprise identifiers for the transforms and/or the various phases into which the transforms are organized, as well as identifiers for the executable code, or objects, that may be associated with operation of the various transforms. The second column may comprise information for locating the items identified in the first column, e.g., the URIs for listed transforms, or locational and/or operational information for the executable code.

The data in a collection can be maintained per help collection, so each application or content provider can tailor it to their specific needs. The default help service may provide it's own implementation of a collection. In one embodiment, the default collection can comprise the transforms and executable code discussed with reference to FIG. 5 and FIG. 6. This default collection can thus comprise XSLTs for a structural and a presentation phase, and any corresponding extensibility objects for use in the base default service.

Multiphase Transform Engine

Figure 4:
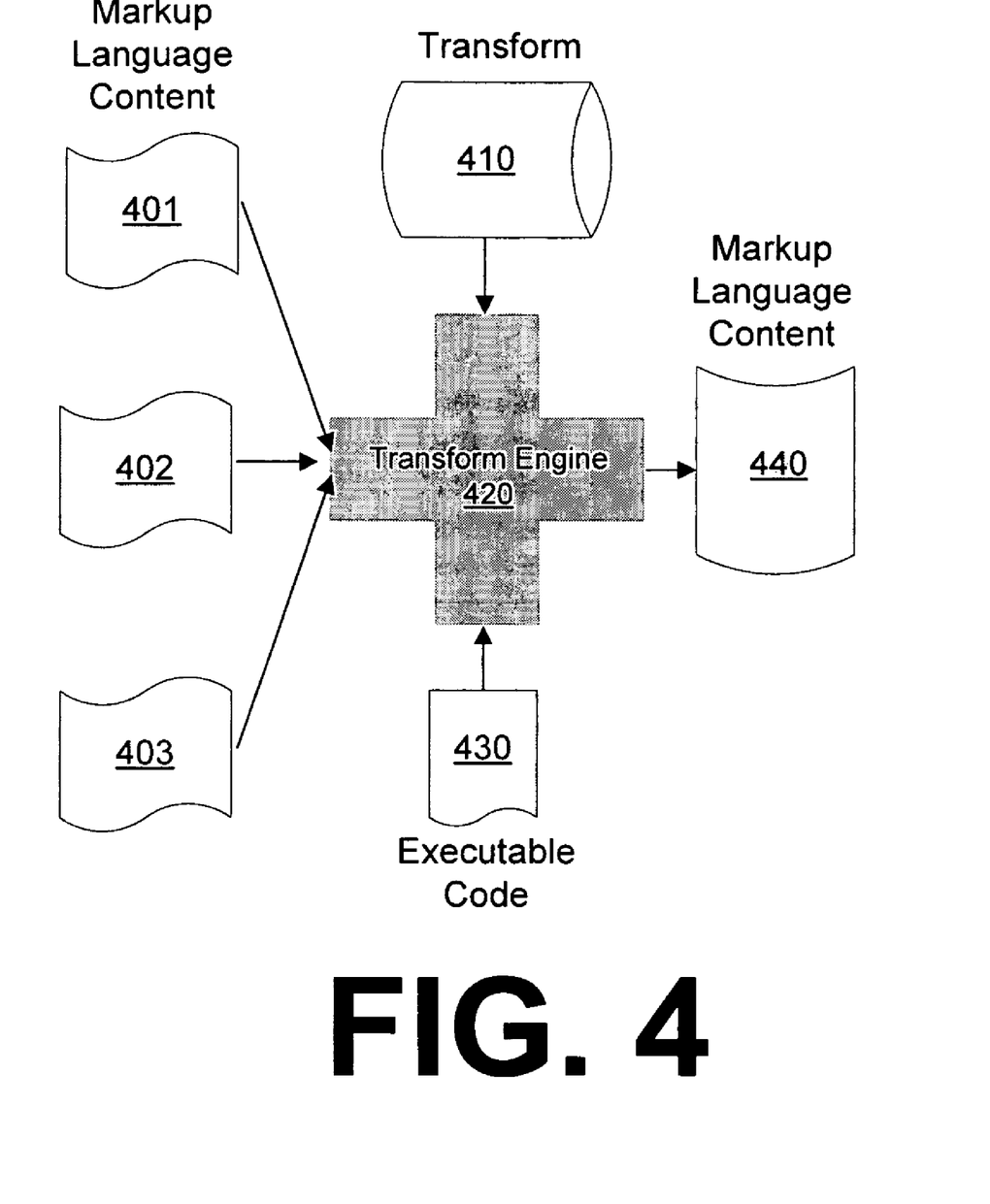
FIG. 4 illustrates transforming markup language content 401, 402, 403 into markup language content 440. A transform engine 420 may apply transform 410 to markup language content 401, 402, 403, thus adding to, modifying, or removing content from 401, 402, 403 in accordance with the instructions from 410. Transform engine 420 may also call executable code 430 to provide some processing and/or generate properties for markup language content 440.

FIG. 4 illustrates transforming markup language content 401, 402, 403 into markup language content 440. FIG. 4 is included here for the purpose of introducing a transform engine, before discussing an exemplary default multiphase transform engine with reference to FIG. 5. A transform engine 420 may apply transform 410 to markup language content 401, 402, 403, thus adding to, modifying, or removing content from 401, 402, 403 in accordance with the instructions from 410.

Transform engine 420 may also call executable code 430 to provide some processing and/or generate properties for markup language content 440. The executable code 430 that is called by transform engine 420 may be referenced by an element in transform 410. Thus, custom behaviors may be produced by writing and registering a custom transform 410 and referencing executable code 430 from the transform via some predefined referencing means. In other words, a transform 410 may contain a reference to executable code that can be interpreted by the engine 420. The reference may be, for example, a reference to an identifier in a collection. A transform engine can be configured to load and execute any code associated with the identifier.

Figure 5:
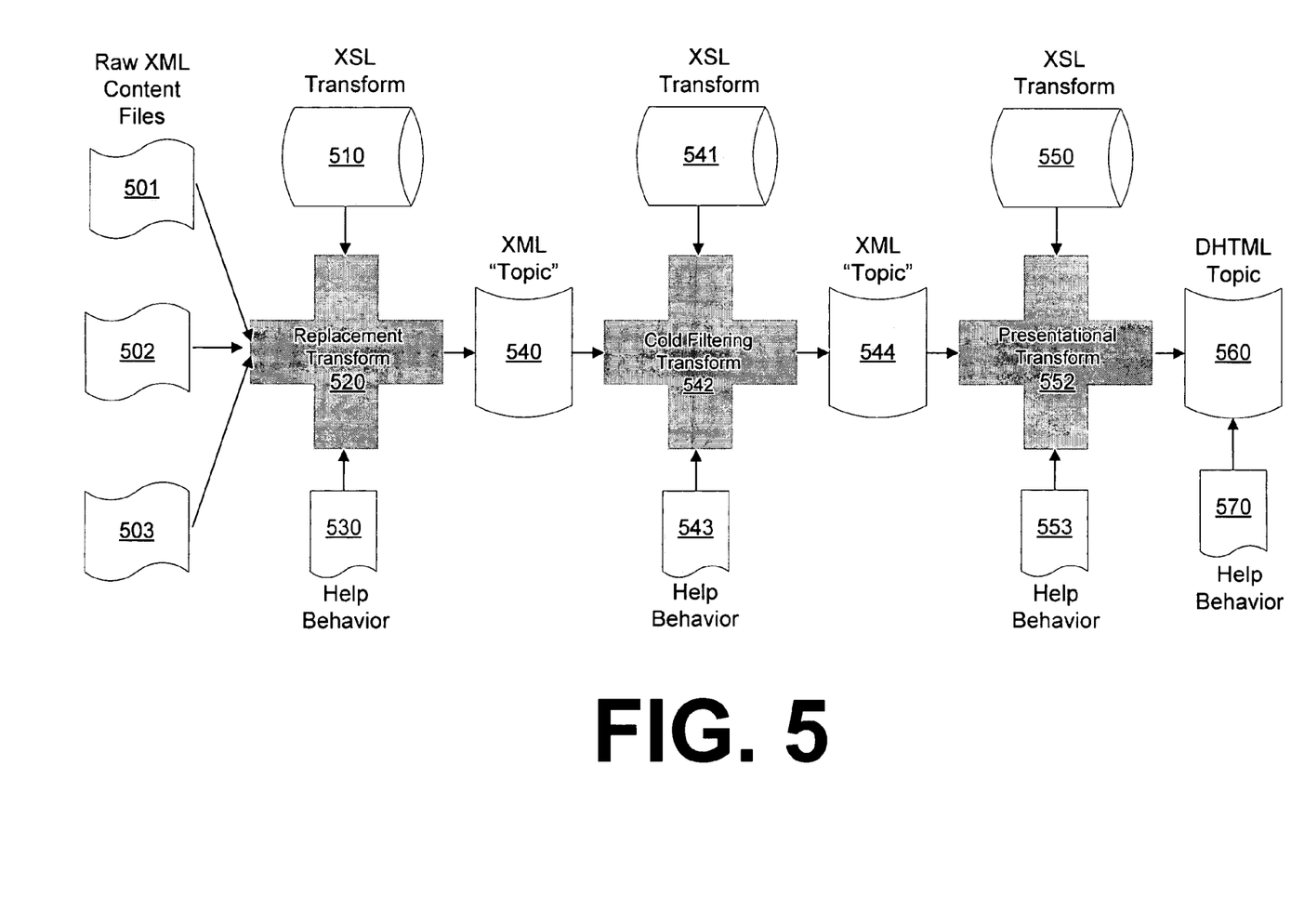
FIG. 5 illustrates an exemplary help service embodiment of the extensible multiphase transform engine. A series of engine operations 520, 542, 552 may operate in succession on the output of the previous engine operation. Engine operations 520, 542, 552 may convert raw XML input 501, 502, 503 into a final output format 560 such as Dynamic Hyper Text Markup Language (DHTML). Transforms 510, 541, 550 governing the details of engine operations may be selected by an application creator to achieve the appearance they desire. Operations 520, 542, 552 may also call help behavior executable code 530, 543, 553 to further customize appearance or behaviors of output 560.

FIG. 5 illustrates an exemplary help service embodiment of the extensible multiphase transform engine. As illustrated, an initialized multiphase transform engine can conduct transform operations 520, 542, 552 according to a plurality of transforms 510, 541, 550. The transform operations shown in FIG. 5 are exemplary default transform operations. Naturally, when different or additional transforms are included in a particular collection, then different transform operations will be initialized.

A series of engine operations 520, 542, 552 may operate in succession on the output of the previous engine operation. Engine operations 520, 542, 552 may convert raw XML input 501, 502, 503 into a final output format 560 such as Dynamic Hyper Text Markup Language (DHTML). Transforms 510, 541, 550 governing the details of engine operations may be selected by an application creator to achieve the appearance they desire. Operations 520, 542, 552 may also call help behavior executable code 530, 543, 553 to further customize appearance or behaviors of output 560.

FIG. 6 provides a flowchart demonstrating exemplary phase-organized operations of a multiphase transformation engine. The illustrated exemplary operations presume a collection of transforms such as that of FIG. 3 is known to the engine at the outset. The collection, and thus the operations of an initialized transformation engine, may apply the two exemplary phases listed in FIG. 6, namely, a structural phase and a presentation phase. The system is not limited to two phases and the phases themselves are conceptual. The structural phase may contain transformations that build a document based on an initial document 601. In the illustrated embodiment, a MAML document 601 may be passed through successive transforms 611, 612, 613 to build up a final document. Depending on the nature of 611, 612, 613, this phase can aggregate other documents, remove content, inject content, and so forth. Some uses of this phase include but are not limited to:

Aggregation or Injection of content: A transform can pull in data from other documents, from data sources such as the web, disk, or by executing code, or any other sources of data that can be handled by the help service.

Filtering: Parts of the document can be removed based on parameters such as user permissions, state of the machine, registry keys, internet connection status, or other sources of information.

Schema Transformation: If a third party wishes to use their own schema, this phase could transform their data into the MAML schema, for example, so that the data may pass through the help service without additional changes.

Next, the presentational phase may transform from the output data from the structural phase, e.g., a MAML document, to a rendering solution 630, or final output, supported by the help service. Some examples of rendering solutions 630 are rich text, plain text, or DHTML. These transformations 621, 622 may also define the look and feel of final help content displayed by a particular application. The presentational transforms 621, 622 may be based on the same data sources those of the structural transforms. This phase may accomplish tasks such as make titles bold or larger, create popup window placeholders, create the appropriate UI representations for links, or other UI specific affordances.

The various techniques illustrated here allow for tailored adaptation to the rendering technologies available to a particular computer system. For example if a computer system has no HTML rendering capabilities, different transform phases can execute and display text or rich text instead. Then at a later date if HTML or a more sophisticated technology that has a transform pass exists the transform engine can make use of that functionality with out any change to the existing application.

Figure 7:
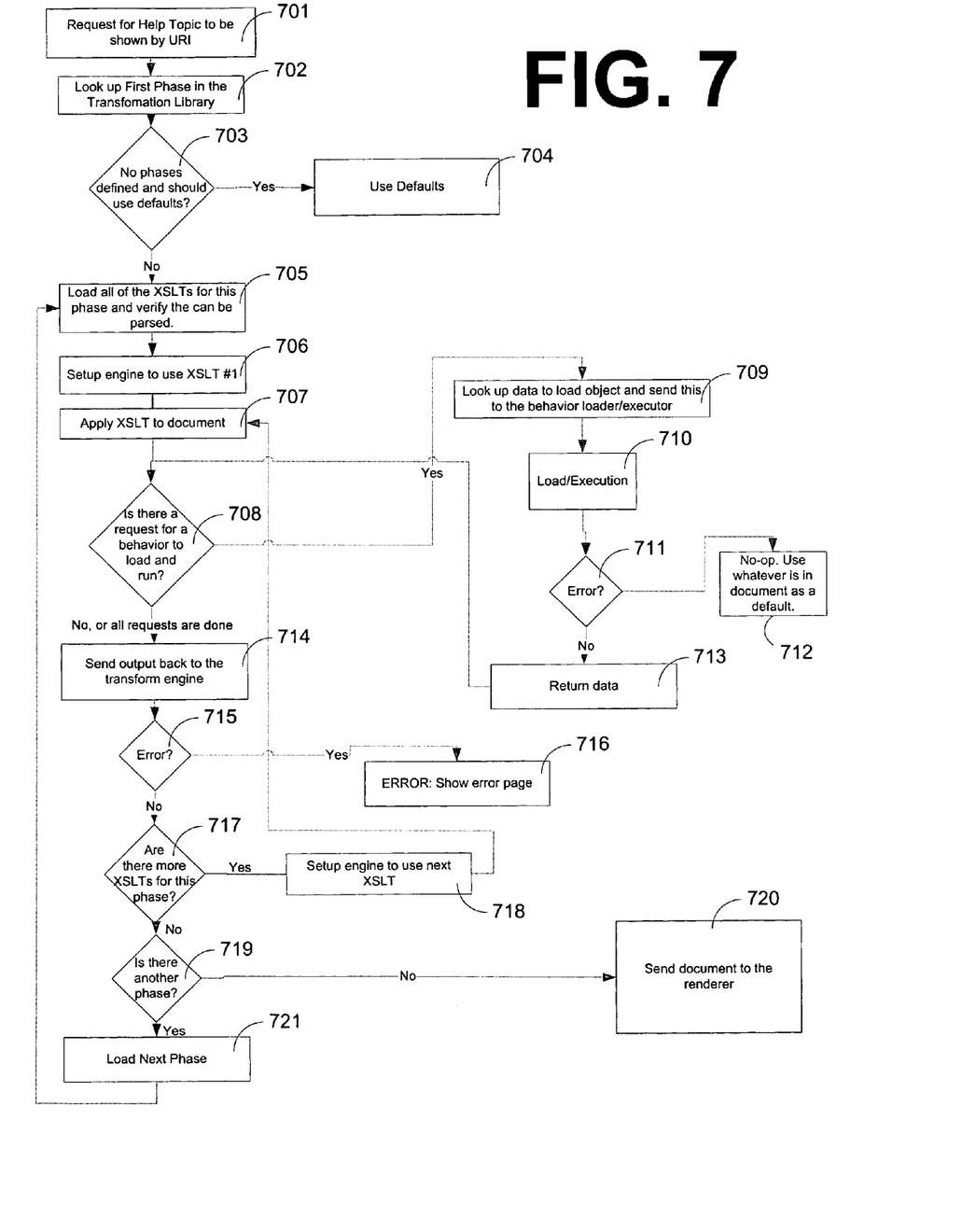
FIG. 7 provides a flowchart demonstrating exemplary operations of a multiphase transformation engine. The illustrated exemplary operations presume a collection of transforms, or transformation library as the collection is referred to in the figure, is known to the engine at the outset.

FIG. 7 provides a flowchart demonstrating exemplary operations of a multiphase transformation engine. The illustrated exemplary operations presume a collection of transforms, or transformation library as the collection is referred to in the figure, is known to the engine at the outset. As illustrated in FIG. 7, an operational sequence for a transform engine may comprise:

1. A request to display a piece of content comes in by way of a URI 701.
2. The system checks the Transformation library for the first phase to execute 702.
   At this juncture, if no phases are listed in a collection 703, the engine may automatically apply a set of default phases 704.
   a) It checks for the availability of the required XSLTs 705.
   b) If they are all available, it can begin transforming the input document by applying the transforms in order 706 and 707.
      The transforms may be identified by URIs and retrieved the same way content is retrieved, by making use of a URI resolver and content retrieval process.
   c) If during transformation a request to execute a behavior based on a specified object tag comes in 708, the engine may look into the extensible object data section 709 and try to load and execute the object 710, returning back any data that is expected 713, based on a common API defined by the help service.
      If any error occurs 710 this step can be skipped and the tag removed or ignored depending on if the transform defines a default in the case of error 712.
   d) Once the first XSL transformation is complete the system moves to the next in the list 717 and 718 until there are no more transformations left for this phase.
3. The subsequent phases 719 are then executed in the same fashion 721 as the first phase until all phases are complete.
   a) If any phase reports failure 715 then the system may stop execution of any additional pages and display an error page 716 indicating that the requested piece of content is unable to be displayed.
4. Once all of the phases have been completed, the data is sent to the rendering component 714, 720 of the help system to be presented to the user.

In embodiments where collections are kept that can adapt to a variety of different rendering technologies, collections may include different transform phases for different rendering targets. For example, a first portion of a collection may comprise a transform library for plain text and a second portion may comprise a transform library for DHTML. In this situation, a selection step can be included in FIG. 7, for example between steps 701 and 702.

When applications are created that draw on a help service such as that provided herein, such applications may alter the way their desired help service content is presented to the application user. Application creators may plug in additional transforms to the help service, or select desired transforms from a list provided by the help service, thereby dictating for their own application which help service transforms are run, and which are not run.

For example, consider an exemplary help service that may be incorporated into the MICROSOFT WINDOWS® operating system. This exemplary operating system help service consumes content in the Microsoft Assistance Markup Language (MAML). MAML provides an XML schema for help service content. Suppose an application creator wanted to use MAML for their application's help content, without any changes to MAML to describe custom content. However, the application creator may want their MAML help content to have a distinctive appearance. For example, the application creator may want all Arial, 14 point, italic font. In this situation, custom transforms could be inserted into the transform engine pipeline to accomplish desired content appearance criteria.

Suppose an application creator wanted to extend MAML by adding additional XML tags to it. Since stock help service transforms would not recognize these tags, the application creator may provide pre-processing or post-processing tags that are recognized. The pre- or post-processing tags may instruct the help service to either call custom code developed by the application creator, or to apply a custom transform to the custom tagged markup content. Such extensibility allows additional help behaviors to be added and called through transforms. Examples of help behaviors are state adaptation, inclusion of content from external sources, product branding, and so forth as described in the U.S. Patent Applications listed above and incorporated by reference.

Extensibility of the system for causing code to execute may be carried out by having special tags that are known by transforms call code, or by a generic process which allows for a string ID to be passed in to a generic object loading and executing mechanism. This process for defining and loading code plugged into our system allows XSL transforms to make use of custom objects as well as the objects provided by a help service.

Among the many useful aspects of the invention, it allows for use of multiple phases of transformation for building a document in a help service; use of multiple phases of transformation for creating a rendering target to be rendered in a help service; extensibility to allow others to register and plug in code to be executed during these stages; extensibility to allow content providers to register and have executed particular transformations in a help service; and ability to selectively turn off or on transformations, or phases for content in a help service.

Exemplary Computing Device and Computer Readable Media

Figure 8:
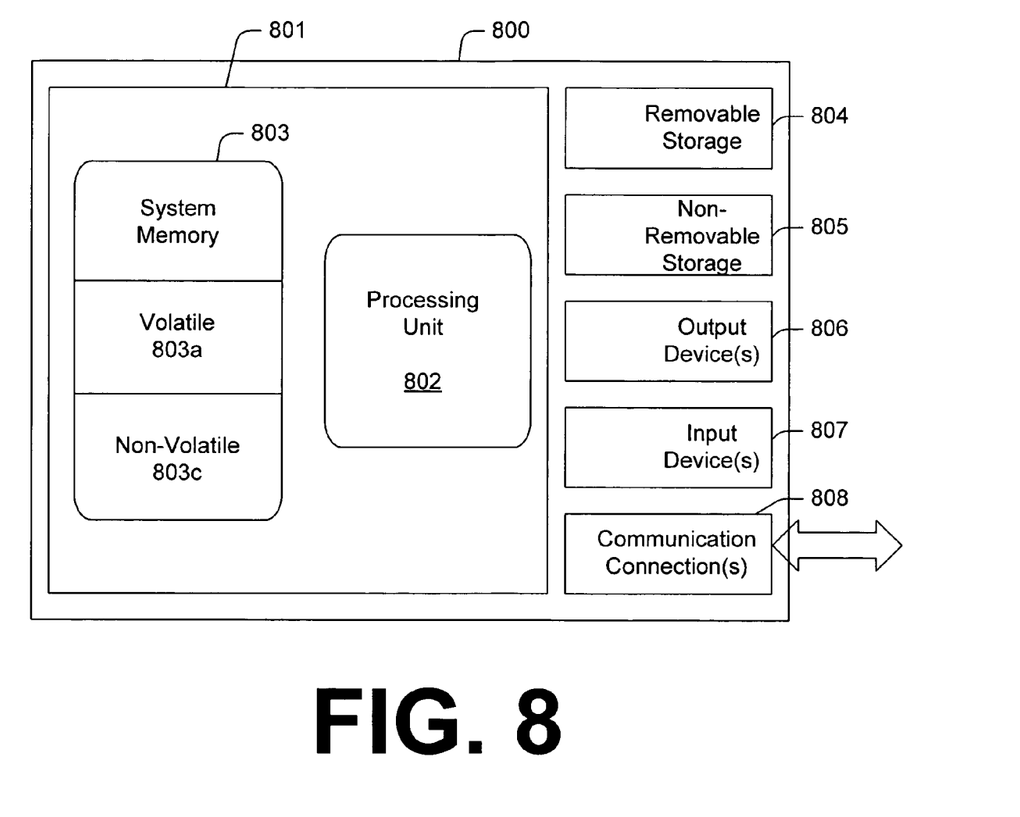
FIG. 8 is a block diagram broadly representing the basic features of an exemplary computing device suitable for use in conjunction with various aspects of the invention. The computing device may access instructions on computer readable media, and execute those instructions in an appropriate sequence for performing the functions of a service for displaying markup content.

With reference to FIG. 8, an exemplary computing device 800 suitable for use in connection with the systems and methods for authenticating a user interface to a computer user is broadly described. In its most basic configuration, device 800 typically includes a processing unit 802 and memory 803. Depending on the exact configuration and type of computing device, memory 803 may be volatile 803A (such as RAM), non-volatile 803B (such as ROM, flash memory, etc.) or some combination of the two. Additionally, device 800 may also have mass storage (removable 804 and/or non-removable 805) such as magnetic or optical disks or tape. Similarly, device 800 may comprise input devices 807 such as a keyboard and mouse, and/or output devices 806 such as a display that presents a GUI as a graphical aid accessing the functions of the computing device 800. Other aspects of device 800 may include communication connections 808 to other devices, computers, networks, servers, and so forth using wired or wireless media.

Volatile memory 803A, non-volatile memory 803B, removable mass storage 804 and non-removable mass storage 805 are examples of computer readable media. Computer readable media may comprise communication media as well as computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computer storage media may be implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium.

The invention may be implemented, at least in part, via computer-executable instructions, such as program modules, being executed by a computer 800. Generally, program modules include routines, programs, objects, components, data structures, etc. that perform particular tasks or implement particular abstract data types.

Computer executable instructions are generally embodied as digital information available to computer 800 on some form of computer readable media. In FIG. 8, for example, system memory 803 may store an operating system and application programs as well as other program modules and program data. Applications and such may be bundled with an operating system, or may exist separately and draw upon operating system services to function.

Finally, it should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user interface techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

What is claimed:

1. A method for providing a customized help service for each of a plurality of applications, comprising:
   (a) storing a library of selectable transforms;
   (b) receiving a help request from an application, said request identifying a help collection associated with the application, wherein the help collection comprises a first row group comprising a listing of transforms to execute, said transforms grouped into a plurality of phases comprising at least a structural phase and a presentation phase and a second row group comprising extensibility object information for objects associated with the collection;
   (c) initializing a help service using the identified help collection;
   (d) iterating over the plurality of phases, wherein for each of a current phase:
   (e) setting a current transform to a first transform in the current phase;
   (f) transforming a help content using the current transform and the extensibility object information, wherein if a transformation request to execute behavior based on a specified object is received, the extensibility object information is consulted to load and execute a corresponding object and return expected data based on a common application programming interface ("API") defined for the help service;
   (g) setting the current transform to a next transform;
   (h) repeating (f)-(g) until all transforms within the current phase have been applied to generate a transformed help content; and
   (i) rendering the transformed help-content for presentation.

2. The method of claim 1, wherein the help content is help content for assisting a computer user in the use of a computer.

3. The method of claim 1, wherein the help content is coded in Extensible Markup Language (XML) content.

4. The method of claim 1, wherein the extensibility object information comprises at least one identifier corresponding to executable code.

5. The method of claim 4 wherein the structural phase includes aggregation of content, filtering of content and schema transformations.

6. The method of claim 5, wherein the presentation phase renders the transformed help content into one of rich text, plain text and DHTML ("Dynamic Hypertext Markup Language").

7. The method of claim 1, wherein the transforms are identified by respective URIs ("Universal Resource Identifiers").

8. A computer readable medium bearing instructions for providing a customized help service for each of a plurality of applications, comprising:
   (a) storing a library of selectable transforms;
   (b) receiving a help request from an application, said request identifying a help collection associated with the application, wherein the help collection comprises a first row group comprising a listing of transforms to execute, said transforms grouped into a plurality of phases comprising at least a structural phase and a presentation phase and a second row group comprising extensibility object information for objects associated with the collection;
   (c) initializing a help service using the identified help collection;
   (d) iterating over the plurality of phases, wherein for each of a current phase:
   (e) setting a current transform to a first transform in the current phase;
   (f) transforming a help content using the current transform and the extensibility object information, wherein if a transformation request to execute behavior based on a specified object is received, the extensibility object information is consulted to load and execute a corresponding object and return expected data based on a common application programming interface ("API") defined for the help service;
   (g) setting the current transform to a next transform;
   (h) repeating (f)-(g) until all transforms within the current phase have been applied to generate a transformed help content; and
   (i) rendering the transformed help-content for presentation.

9. The computer readable medium of claim 8, wherein the help content is help content for assisting a computer user in the use of a computer.

10. The computer readable medium of claim 8, wherein the help content is coded in Extensible Markup Language (XML) content.

11. The computer readable medium of claim 8, wherein the extensibility object information comprises at least one identifier corresponding to executable code.

12. The computer readable medium of claim 11 wherein the structural phase includes aggregation of content, filtering of content and schema transformations.

13. The computer readable medium of claim 12, wherein the presentation phase renders the transformed help content into one of rich text, plain text and DHTML ("Dynamic Hypertext Markup Language").

14. The computer readable medium of claim 8, wherein the transforms are identified by respective URIs ("Universal Resource Identifiers").

15. A system for providing a customized help service for each of a plurality of applications, comprising:
   a processor;
   a memory having stored thereon computer executable instructions for:
   (a) storing a library of selectable transforms;
   (b) receiving a help request from an application, said request identifying a help collection associated with the application, wherein the help collection comprises a first row group comprising a listing of transforms to execute, said transforms grouped into a plurality of phases comprising at least a structural phase and a presentation phase and a second row group comprising extensibility object information for objects associated with the collection;
   (c) initializing a help service using the identified help collection;
   (d) iterating over the plurality of phases, wherein for each of a current phase:
   (e) setting a current transform to a first transform in the current phase;
   (f) transforming a help content using the current transform and the extensibility object information, wherein if a transformation request to execute behavior based on a specified object is received, the extensibility object information is consulted to load and execute a corresponding object and return expected data based on a common application programming interface ("API") defined for the help service;

(g) setting the current transform to a next transform;

(h) repeating (f)-(g) until all transforms within the current phase have been applied to generate a transformed help content; and (i) rendering the transformed help-content for presentation.

16. The system of claim 15, wherein the help content is help content for assisting a computer user in the use of a computer.

17. The system of claim 15, wherein the help content is coded in Extensible Markup Language (XML) content.

18. The system of claim 15, wherein the extensibility object information comprises at least one identifier corresponding to executable code.

19. The system of claim 18 wherein the structural phase includes aggregation of content, filtering of content and schema transformations.

20. The system of claim 19, wherein the presentation phase renders the transformed help content into one of rich text, plain text and DHTML ("Dynamic Hypertext Markup Language").

* * * * *